(12) United States Patent
Krus et al.

(10) Patent No.: US 7,909,134 B2
(45) Date of Patent: Mar. 22, 2011

(54) SHIELDING ELEMENT FOR MOTOR VEHICLES

(75) Inventors: Ralf Krus, Lindlar (DE); Joachim Paulus, Dusseldorf (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 83 days.

(21) Appl. No.: 11/909,376

(22) PCT Filed: Feb. 7, 2006

(86) PCT No.: PCT/EP2006/001055
§ 371 (c)(1),
(2), (4) Date: Sep. 21, 2007

(87) PCT Pub. No.: WO2006/099913
PCT Pub. Date: Sep. 28, 2006

(65) Prior Publication Data
US 2009/0026008 A1    Jan. 29, 2009

(30) Foreign Application Priority Data

Mar. 22, 2005  (DE) .................... 10 2005 013 311

(51) Int. Cl.
*E04H 17/00*  (2006.01)
*E04B 1/82*  (2006.01)
*B32B 3/10*  (2006.01)
(52) U.S. Cl. .................. 181/210; 181/290; 428/138
(58) Field of Classification Search .................. 181/210, 181/290; 428/138
See application file for complete search history.

(56) References Cited

U.S. PATENT DOCUMENTS

| 4,642,951 | A | * | 2/1987 | Mortimer | 52/145 |
|---|---|---|---|---|---|
| 5,996,730 | A | * | 12/1999 | Pirchl | 181/211 |
| 6,139,974 | A | * | 10/2000 | Atkinson et al. | 428/595 |
| 6,276,044 | B1 | * | 8/2001 | Ragland et al. | 29/521 |
| 6,302,466 | B1 | * | 10/2001 | Zwick | 296/39.3 |
| 7,000,979 | B2 | * | 2/2006 | Borkowski et al. | 296/192 |
| 7,063,184 | B1 | * | 6/2006 | Johnson | 181/290 |
| 7,383,918 | B1 | * | 6/2008 | Sitko | 181/218 |
| 7,445,084 | B2 | * | 11/2008 | Berbner et al. | 181/290 |

(Continued)

FOREIGN PATENT DOCUMENTS

DE    4329411 C2    4/1995

(Continued)

*Primary Examiner* — Lincoln Donovan
*Assistant Examiner* — Christina Russell
(74) *Attorney, Agent, or Firm* — Robert L. Stearns; Dickinson Wright, PLLC

(57) ABSTRACT

A screening element for motor vehicles is disclosed with a lead-in element which provides a preferred heat, sound and vibration uncoupling in the body region. The screening element supplied in this case comprises at least two separated outer layers between which an insert is arranged, wherein the at least two separated outer layers and the insert have coaxial openings which form a common opening in which a lead-in element is received or mounted, wherein the openings of the respective outer layers have a larger cross-sectional area than the opening of the insert, where the lead-in element is connected to the insert in such a manner that there is no contact with the outer layers. The screening element or heat shield therefore has a sufficient heat, sound and vibration uncoupling, can be produced at low cost without manual operations, and is simple to assemble. Moreover, a heat and vibration transmission of hot components from the engine compartment or underfloor to the body is prevented at the fastening points of the screening element.

21 Claims, 7 Drawing Sheets

U.S. PATENT DOCUMENTS

| | | | |
|---|---|---|---|
| 2006/0091699 A1* | 5/2006 | Braun et al. | 296/181.2 |
| 2006/0207826 A1* | 9/2006 | Williams | 181/214 |
| 2008/0075912 A1* | 3/2008 | Malinek | 428/71 |
| 2008/0289902 A1* | 11/2008 | Krus | 181/290 |
| 2010/0086766 A1* | 4/2010 | Malinek | 428/312.6 |

FOREIGN PATENT DOCUMENTS

| | | |
|---|---|---|
| DE | 198 49 366 A1 | 4/1998 |
| DE | 102 46 998 A1 | 4/2004 |
| EP | 0 917 507 A | 9/1999 |
| EP | 1 459 939 A | 9/2004 |
| JP | 2000 034938 A | 2/2000 |

\* cited by examiner

SHIELDING ELEMENT FOR MOTOR VEHICLES

BACKGROUND OF THE INVENTION

1. Technical Field

This invention relates to a screening element, and this invention relates in particular to a screening element for motor vehicles with a guiding element for thermal, acoustic and vibration insulation and damping.

2. Related Art

Today there are many applications for screening elements. Special applications or screening elements are found, in particular, in the automotive industry where screening elements are used as heat shields in order, for example, to protect passengers or components from heat and vibrations generated in the engine.

For such applications the screening elements must be sufficiently fixed and rigid to retain their shape at high loads and also to protect passengers from a substantial portion of the heat and vibration generated.

The use of a simple metal plate, e.g. of aluminium or an alloy, is often insufficient because although a metal sheet can reduced infrared radiation and convection, it has too few acoustic insulation properties, for example.

Furthermore, the screening elements mentioned in the state of the art have the unfavorable characteristic that they transmit to the fastening points of the body, for example, the thermal radiation, sound waves and vibrations which are absorbed by the screening element, and therefore ultimately transfer them to the body of the vehicle, which means that the passengers and heat-sensitive components of the vehicle are no longer protected to the optimum decree.

Such a screening element is disclosed, for example, in EP 0 917 507 B1. Here a method is disclosed for producing a heat insulating composite plate. The task of limiting the transmission of heat, sound and vibrations to the components surrounding the composite plate is not discussed here, however.

DE 43 29 411 C2 is also concerned with a heat, sound and vibration insulating and damping material and a method for its production. Here a heat and sound insulating and vibration damping material is disclosed consists of a plurality of films of non-ferrous material, particularly aluminium, that are profiled one on the other.

The material may be used as industrial insulation and as a heat protection shield in the manufacture of motor vehicles and wagons. The problem of providing sufficient containment of the transmission of heat, sound and vibrations to the components surrounding the composite plate is not solved here either.

SUMMARY OF THE INVENTION

The object of this invention is therefore to provide a screening element or heat shield for motor vehicles which has sufficient heat and sound insulation and vibration damping, can be produced at low cost without manual operations, and can be easily assembled, and which also prevents the transmission of heat, sound and vibrations from hot, loud and vibrating components in the engine compartment or underfloor region to a vehicle body.

To achieve the object this invention provides for the screening element for motor vehicles, particularly for the thermal and/or acoustic screening of a component radiating heat and/or sound, to comprise at least two separated outer layers between which at least one insert is arranged, the at least two separated outer layers and the insertion having coaxial openings which form a common opening in which an lead-in element is received or mounted, the openings of the outer layers having a larger cross-sectional area than the opening of the insert, and for the lead-in element, with the insert, to be in contact or to be connected to each other in such a manner that it does not form a contact with the outer layers.

The insert arranged between the outer layers may in this case be a lattice-shaped expanded metal layer, but may also be a plastic lattice.

In the region of the outer layers of the screening element of this invention the openings are preferably cut out so that they are larger than the opening of the inner insert, whose coaxial openings then form a common opening in which an lead-in element is received or mounted.

Because of the varying size of the openings there is therefore no contact of the lead-in element with the outer layers of the screening element and this therefore results in an uncoupling of the heat, sound and vibrations.

One advantage of this invention lies in the fact that the insert provides the possibility of fitting a single- or multi-part metal lead-in element in the region of the opening of the insert, loosely or in a fixed manner, without coming into contact with the outer layers of the screening element.

The screening element of this invention can be screwed or fastened by other means in the vicinity of a hot component of the body region with the received or mounted lead-in element.

One advantage of this invention lies in the fact that the transmission of temperature, sound and vibrations of the hot component to the screening element through the openings in the outer layers is prevented because the screening element is suspended on the insert and fastening means received.

According to a first embodiment of this invention the openings of the outer layers are of different sizes and/or also have different shapes.

This provides the possibility of suitably and specifically influencing and adjusting the vibration behaviour of the screening element.

This provides the advantage that the heat transfer from the heat shield to the fastening point can be influenced and the vibration behaviour of the screening element can also be adapted.

A further point relates to the compression of the single- or multi-part lead-in element of this invention with the insert arranged between the outer layers. This compression of the single- or multi-part lead-in element in the direction of the insert may be varied out with varying intensity, either in a fixed compression or a loose compression.

In the case of a fixed compression of the single- or multi-part lead-in element with the insert of this invention the thermal expansion of the hot component is compensated for only by the insert.

On the other hand, in the case of a loose compression of the lead-in element with the insert, the insert can also be moved in the lead-in element, during the thermal expansion of the hot component, before the insert performs the remaining length compensation.

The air gap between the single- or multi-part lead-in element and the insert must be chosen so that it is individually adjustable according to the application.

A further advantage of the invention lies in the fact that because the variable intensity of the compression of the lead-in element with the insert, suitable adjustments can be made when the heat shield is subsequently assembled, since the lead-in element can be displaced freely rotatably or longitudinally about an axis C (see FIGS. 5-7).

According to a further embodiment of this invention the screening element has a collar in the region of the openings of the outer layers, which collar provides a better connection between the outer layers and the insert.

It is also preferable, in this invention, for the insert to be an expanded metal which has a regular mesh network and/or a defined pre-tension, the corresponding heat, sound and/or vibration transmission being dependent on this pre-tension.

In addition, the mesh size of the insert may vary.

Furthermore, it is preferable in this invention for the insert to be a lattice.

It is also preferable for the insert to consist of a metal lattice of a plastic lattice.

It is also preferable for the insert to be an insulated lattice.

According to a further embodiment of this invention it is preferable for the outer layers, with the at least one insert arranged between them, to be connected to each other by forming each layer in a multiplicity of essentially parallel, upright ribs extending in a first direction (A) and separated by recesses, the recesses of each layer being received in the ribs of the other layer and the recesses having corresponding lateral walls land varying in width along their length, where corrugations extend in a second direction (B) and are inclined at an angle of at least 10° to the first direction (A), and where the corrugations are essentially constant in the width along their length.

According to a further aspect of this invention it is preferable for the at last two separated layers to be capable of being actively connected to each other, and for the surfaces of the layers to have any spatial and surface formation.

In addition, it is preferable in this invention for the lead-in element to be single- or multi-part.

Furthermore, it is preferable for the lead-in element to be two-part.

It is also preferable for the lead-in element to be a rivet (rivets).

In addition it is preferable for the lead-in element to be connected with radial clearance to the insert so that it is mounted rotatably about an axis C.

In addition, it is preferable for the lead-in element to have, on the side facing the first outer layer, a circular cross-section with a diameter which ranges from 10 mm to 25 mm.

Moreover, it is preferable for the lead-in element to have, on the side facing the second outer layer, a circular cross-section with a diameter which ranges from 10 mm to 25 mm.

It is further preferable for the lead-in element to have, on the side facing the second outer layer, a circular cross-section with a diameter ranging from 10 mm to 25 mm.

It is also preferable for the diameter of the opening of the lead-in element to be between 5 mm and 15 mm.

It is also preferable for the lead-in element to have a material thickness of between 1.09 and 6.0 mm.

It is further preferable for the multi-part lead-in element to have in the common opening a depth ranging between 0.5 mm and 2.5 mm.

It is also preferable for the lead-in element to be mounted essentially loosened or unfixed in the opening.

It is further preferable for the lead-in element to be mounted essentially in a fixed manner in the opening.

It is also preferable for a collar to surround the edge of the openings of the outer layers in a fixed manner.

It is further preferable for the insert to consist of aluminium, noble metal, refined steel and/or aluminium-coated refined steel or their combinations.

According to a further aspect of this invention it is preferable for the insert, which is located in the intermediate region between the opening of the at least two outer layers and the opening of the insert, to be parallel to the end faces of the outer layers lying one above the other.

According to a further aspect of this invention it is preferable for the area which the insert occupies between the outer layers to be larger than the area of the openings made in the outer layers.

According to a further embodiment of this invention it is preferable for the angle between the direction of the ribs and the direction of the corrugations to be between 1° and 90°, preferably essentially 90°.

It is further preferable for the at least one opening of the at least two separated outer layers of the screening element to be of any shape, preferably circular.

It is preferable for the lead-in element to b composed of any mechanical connection, such as a single- or multi-part lead-in element, preferably a single- or multi-part rivet (rivets).

Furthermore, it is preferable for the lead-in element to act as a compression limiter in order not to deform the geometry of the insert.

According to a further aspect of this invention it is preferable for the multi-part lead-in element to consist of two parts, an upper part and a lower part, the parts being designed in such a manner that they can be pressed together through an opening of the insert, thereby surrounding the opening of the insert compressed to a greater or lesser extent. A desired heat and sound insulation and vibration damping can therefore be achieved.

It is further preferable for the upper and lower part of the multi-part lead-in element to consist of the same or different material deriving from the group of sheet aluminium, noble metal, refined steel and aluminium-coated steel.

Furthermore, it is preferable for the upper and lower part of the multi-part lead-in element to have the same or different material thicknesses.

It is also preferable for the material thickness of the single-part lead-in element to be able to vary spatially, but preferably to have a constant material thickness.

It is further preferable for the single-part lead-in element to have any shape.

It is also preferable for the multi-part lead-in element to have any shape.

It is also preferable for the upper and lower part of the multi-part lead-in element to be shaped essentially identically.

In a further embodiment it is preferable for the at least two outer layers of the screening element and the at least one lead-in element not to touch each other.

According to a further aspect of this invention it is preferable for the lead-in element and the insert to contact each other more or less superficially in a surface section of the lead-in element.

Furthermore it is preferable for the opening of the insert to have a circular cross-section.

It is preferable for the collar surrounding the opening of the outer layers in a fixed or loose manner to be of a circular shape.

It is preferable for the collar surrounding the opening in a fixed or loose manner to be single- or multi-part.

It is also preferable for the lead-in element to be centred around the opening of the insert of the screening element.

It is preferable for the lead-in element to have an opening with a circular cross-section.

According to this invention it is preferable for the outer layers lying above each other to be able to comprise a plurality of layers which comprise metal material, preferably sheet aluminium, noble metal, refined steel, Al-coated steel or their combinations.

It is preferable, if there is more than one insert, for the individual inserts to be able to comprise aluminium, noble metal, refined steel, Al-coated steel or their combinations.

It is preferable for the at least one insert to have a mesh size of a predetermined value.

It is preferable for the at least two outer layers of the screening element to be provided at least on the insert side with smooth end faces.

According to a further embodiment of this invention it is preferable for the ribs of the outer layers of the screening element to vary in width in a regular manner.

It is preferable for the ribs of the outer layers of the screening element to vary in height along the length of the rib, the greatest height occurring at the narrowest or most confined points on the rib.

In a further embodiment it is preferable for a plurality of layers of a heat insulating or sound and vibration damping insert, which may preferably be a lattice-shaped expanded metal, preferably a lattice, to be enclosed between the at least two outer layers of the screening element.

It is further preferable for the connection of the outer layers lying one above the other to be brought about by at least partial flanged by edge regions of at least one of the metal outer layers.

It is preferable for the screening element to be received in a heat shield.

According to a further aspect of this invention it is preferable for the screening element to be connected by the at least one opening of the lead-in element to a further component in the body compartment, etc.

It is also preferable for the screening element to be able to be used as a heat shield and/or vibration protection element.

It is preferable for either the front and/or the rear side of the screening element to be directed towards the heat source(s) and/or the vibration source(s).

It is also preferable for one or a plurality of screening elements arranged next to each other and/or above each other to be directed with their front and/or rear sides to the heat source(s) and/or vibration source(s).

Finally it is preferable for the screening element to be able to be used as a material for any further applications.

BRIEF DESCRIPTION OF THE DRAWINGS

Further advantages, features and possible applications of this invention are evident from the following description of preferred embodiments in association with the drawings.

DETAILED DESCRIPTION OF THE DRAWING

Figure 1:
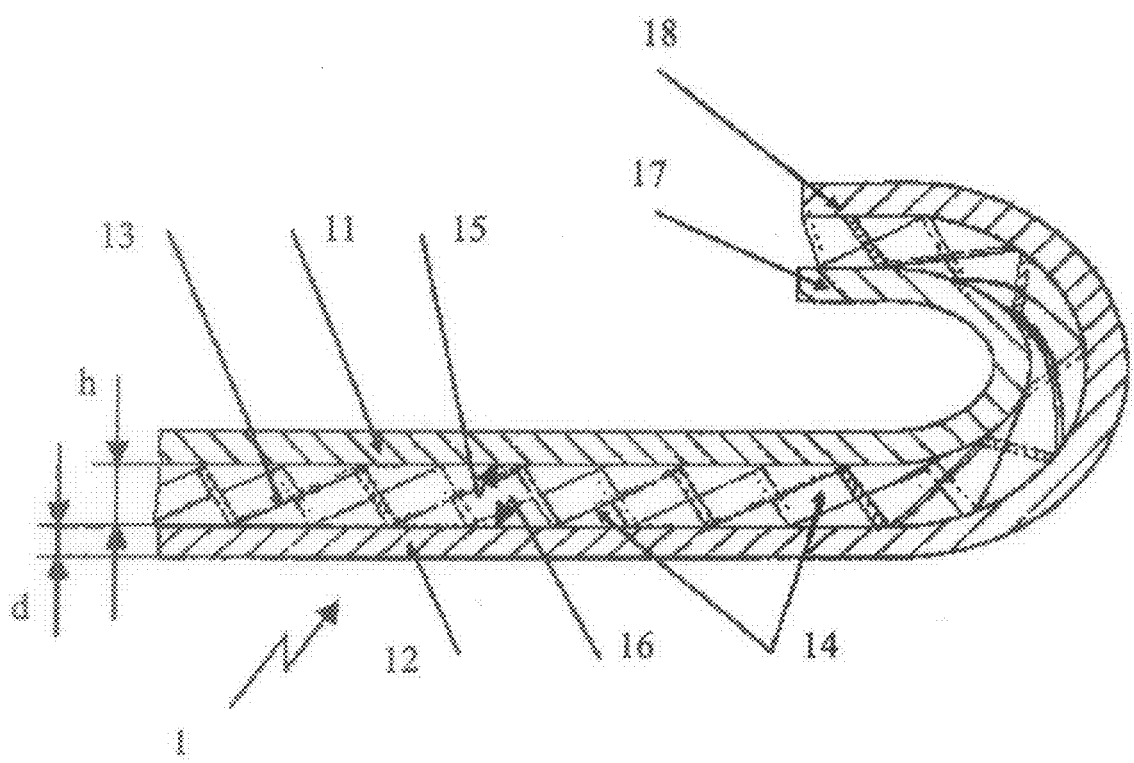
FIG. 1 shows a diagrammatic cross-sectional view of an embodiment of a screening element according to the invention designed as a heat shield without integrated temperature and vibration coupling element.

FIG. 1 shows a cross-sectional view of a screening element 1 designed as a heat shield, without coaxial openings and without a lead-in element.

Such a screening element may, for example, be used in the exhaust gas line or in the body region of a motor vehicle.

The screening element shown comprises two outer layers 11 and 12 with essentially the same material thickness, one layer of an insert 13 extending between outer layers 11 and 12, which insert may, according to the application, be a lattice-shaped expanded metal with a defined pre-tension.

Individual chambers 14 of insert 13 form suitable air cushions between smooth end faces 15 and 16 of outer layers 11 and 12, the number of air cushions varying due to the variation of distance h between the two end faces 15 and 16.

These cushions of air give rise to a more or less optimum heat and/or sound insulation and/or vibration damping between correspondingly hot and/or loud and/or vibration damping regions in the body region, and correspondingly less hot and/or less loud and/or less vibrating regions in the body region.

End regions 17 and 18 of outer layers 11 and 12 of screening element 1 are connected to each other by suitable flanging.

However, when screening element 1 is fastened to hot and/or loud and/or vibrating regions in the motor vehicle this results in undesirable heat conduction and sound and vibration transmission from screening element 1 to the fastening means surrounding screening element 1 and hence to the body.

Figure 2:
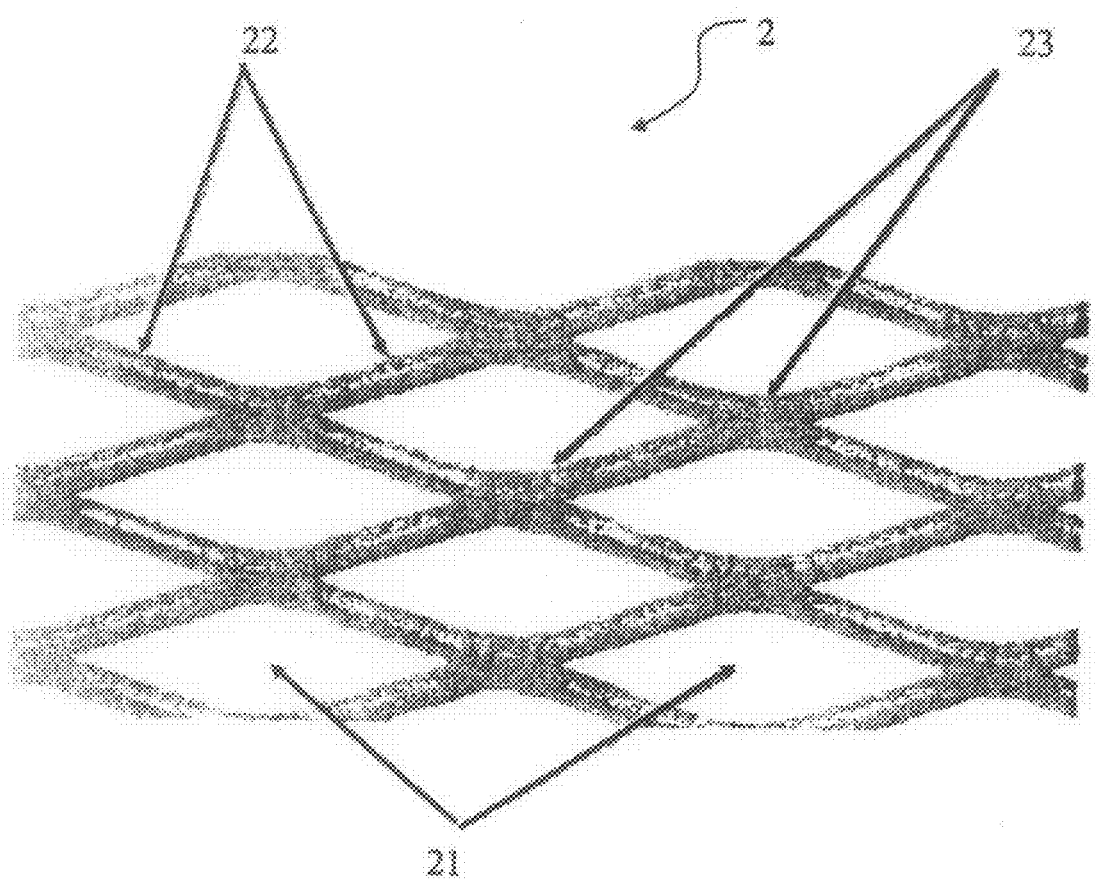
FIG. 2 shows an elevation of an embodiment of an insert according to the invention.

FIG. 2 shows an elevation of an insert 13 shown in FIG. 1 and used in this invention, which insert is an expanded metal layer 2 in FIG. 2.

The lattice structure of expanded metal layer 2 is seen here, a multiplicity of meshes 21 being formed in this case.

Meshes 21 are formed by bridges 22, nodal points 23 being formed at the point of intersection between four bridges 22 abutting each other.

Expanded metal 2 has a predetermined height h as already shown in FIG. 1, between the at least two outer layers 11 and 12 of screening element 1.

Different mesh widths, mesh lengths, bridge thicknesses and bridge widths are produced by varying a corresponding pre-tension of expanded metal 2.

Different technical requirements (heat insulation, sound and vibration damping) in the engine region of a motor vehicle can be met by means of defined pre-tensions of expanded metal 2.

Figure 3:
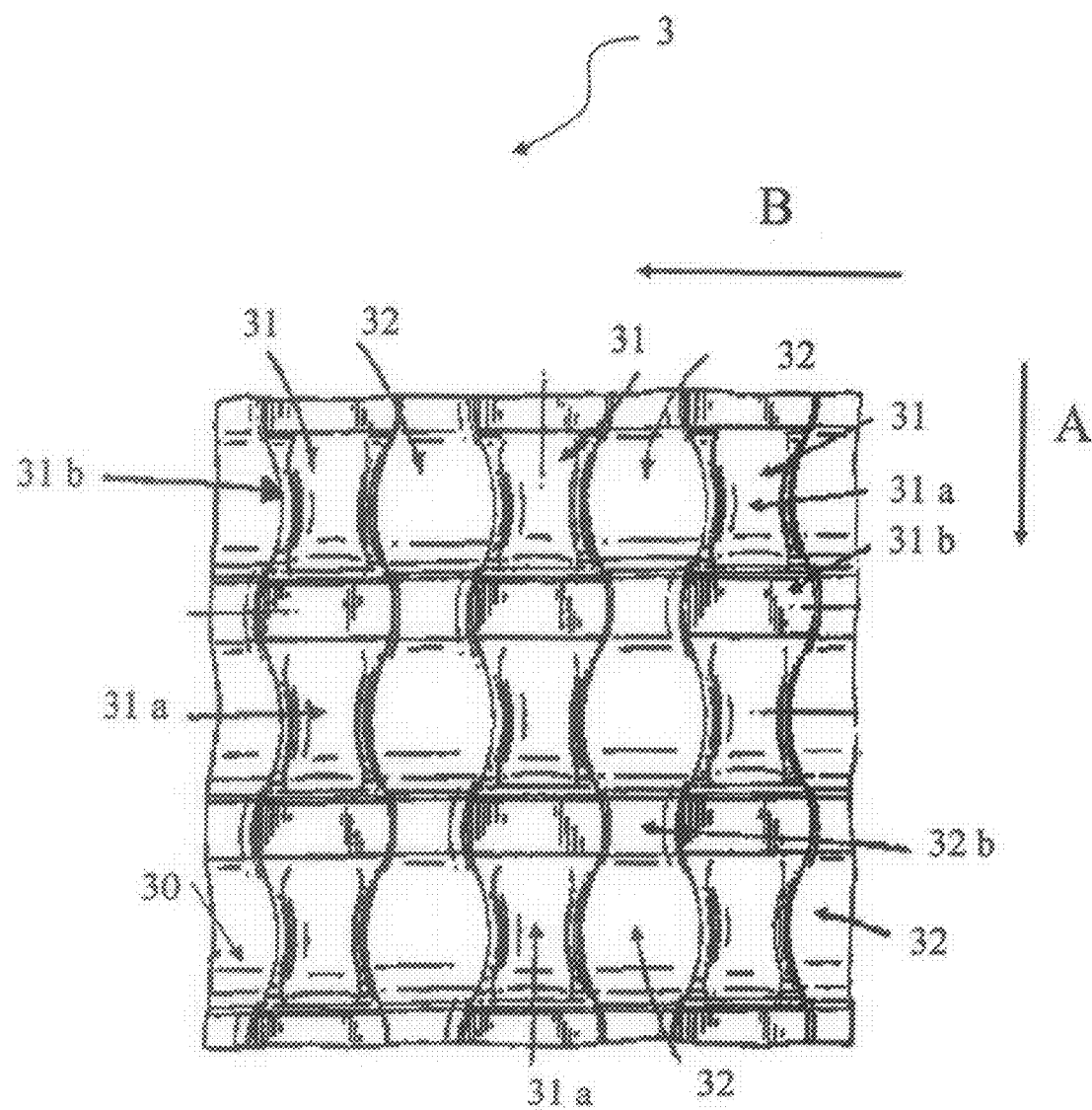
FIG. 3 shows an elevation of an embodiment of a screening element according to the state of the art.

FIG. 3 shows a diagrammatic elevation of an embodiment of a screening element 3 of prior art, which ha no coaxial openings and no lead-in element.

The surface of outer layer 30 of screening element 3 is visible in FIG. 3.

In the representation outer layer 30 has a plurality of essentially parallel, upright ribs 31 extending in one direction, which ribs extend in a first direction (A), and a plurality of essentially upright corrugations 31b and 32b extending in a second direction (B).

The width of ribs 31 along their length varies here, whilst the width of corrugations 31b and 32b remains essentially constant.

In this case ribs 31 have the greatest height of rib 31 in region 31a, where the ribs have the smallest diameter.

On the other hand rib 31 has, in region 31b, the smallest height on outer layer 30 of screening element 3.

The first (A) and second (B) direction of ribs 31 and corrugations 31b and 32b are here inclined by an angle of at least 10°, preferably 90°.

Furthermore, the maximum and minimum heights of the rear side of the screening element are provided in an opposing manner, i.e. a minimum on the first outer side of screening element 3 has a maximum on the side of screening element 3 facing away from the first outer side.

Because of the sequence of minima and maxima it is possible for ribs 31 of the first outer layer to be received in the recesses of the second outer layer.

Figure 4:
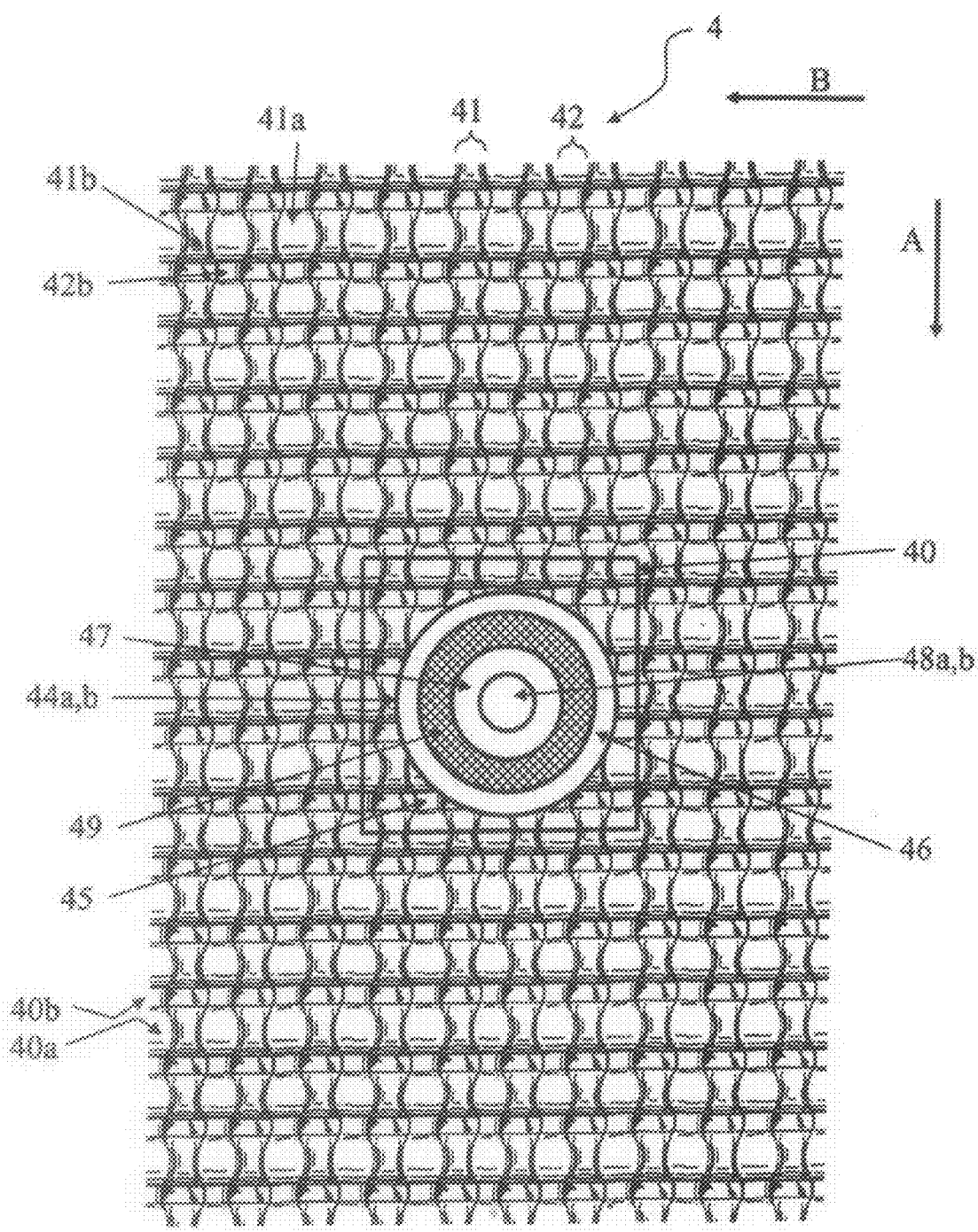
FIG. 4 represents an elevation of an embodiment of a screening element with a lead-in element according to this invention.

FIG. 4 shows an elevation of a screening element 4 of this invention with coaxial openings 44a, 4b of the at least two outer layers 40a and 40b and with coaxial opening 48a of insert 49, which form a common opening 48b in which a lead-in element 47 is received.

Furthermore, in this invention openings 44a and 44b of outer layers 40a, 40b respectively are larger than opening 48a of insert 49.

This provides the possibility of fitting a single- or multi-part metal lead-in element 47 in opening 48a of insert 49 without coming into contact with outer layers 40a, 40b, which also results in an improved heat insulation and sound and vibration damping.

The surface of outer layer 40a of screening element 4 is shown in elevation.

Here outer layer 40a has a plurality of essentially parallel, upright ribs 41 extending in one direction, which ribs extend in a first direction (A), and a plurality of essentially upright corrugations 41b and 42b extending in a second direction (B).

The width of ribs 41 along their length varies here, whilst the width of corrugations 41b and 42b remains essentially constant.

In this case ribs 41 have the greatest height of rib 41 in region 41a, where the ribs have the smallest diameter.

On the other hand, rib 41 has in region 41b the lower height on the outer layer of screening element 4.

The first and second directions of the ribs and corrugations are in this case inclined by an angle of at least 10°, preferably by 90°.

The maximum and minimum heights of the rear side of screening element 4 are arranged in an opposing manner, i.e. a minimum on the first outer side of screening element 4 has a maximum on the side of screening element 4 facing away from the first outer side.

Because of the sequence of minima and maxima it is possible, for example, for the ribs of the first outer layer 40a to be received in the recesses of the second outer layer 40b.

Lead-in element 47 is in this case designed either in a single- or multi-part form and is arranged centred in opening 48a of insert 49.

Furthermore, the element comprises a collar 46 which surrounds edge 45 of openings 44a and 44b of outer layers 40a, 40b in a fixed or loose manner.

In addition, an insert 49 extends in the intermediate region between collar 46 and the lead-in element essentially parallel with the outer layers lying one above the other.

Collar 46 is correspondingly compressed in a fixed manner with edge 45 of openings 44a, 44b of outer layers 40a, 40b in order to fasten the intermediate region between the outer layers and the insert.

This provides a more or less intense compression 40 around edge region 45 of openings 44a and 44b of outer layers 40a and 40b of screening element 4.

Insert 49 of screening element 4 of this invention, arranged between outer layers 40a and 40b, comprises at least one insert, which may be a lattice-shaped expanded metal or a plastic lattice.

The insertion of insert 49 prevents a corresponding heat, sound and vibration transmission from screening element 4 to lead-in element 47 and its fastening means, and hence subsequently to the body surrounding screening element 4.

The lead-in element allows a screw connection of screening element 4 to a hot component by means of the single- or multi-part metal lead-in element 47.

Furthermore, single- or multi-part lead-in element 47 acts as a compression limiter.

According to a further embodiment of this invention the freely cut region of opening 44a and 44b of outer layers 40a, 40b may vary in size and/or may also have different shapes. The vibration behaviour of screening element 4 can be specifically influenced and adjusted in this manner.

Furthermore, the mesh size of insert 49 may vary depending on a suitably defined pre-tension of insert 49.

As a result the heat transmission from screening element 4 to the fastening point can be influenced and the vibration behaviour of screening 4 can also be adapted.

According to a further aspect of this invention the compression of lead-in element 47 with insert 49 may be of varying intensity.

In the case of a fixed compression of lead-in element 47 with insert 49, the thermal expansion of the hot component can only be compensated for by insert 49.

In the case of a loose compression of lead-in element 47 with insert 49, insert 49 may also move in lead-in element 47, during the thermal expansion of the hot component, before insert 49 performs the remaining length compensation.

The air gap between lead-in element 47 and the insert is individually adjustable and must be selected according to the application.

Furthermore, subsequent assembly adjustments may be made by a loose compression which allows a rotation and/or longitudinal displacement of lead-in element 47 along axis C.

Figure 4A:
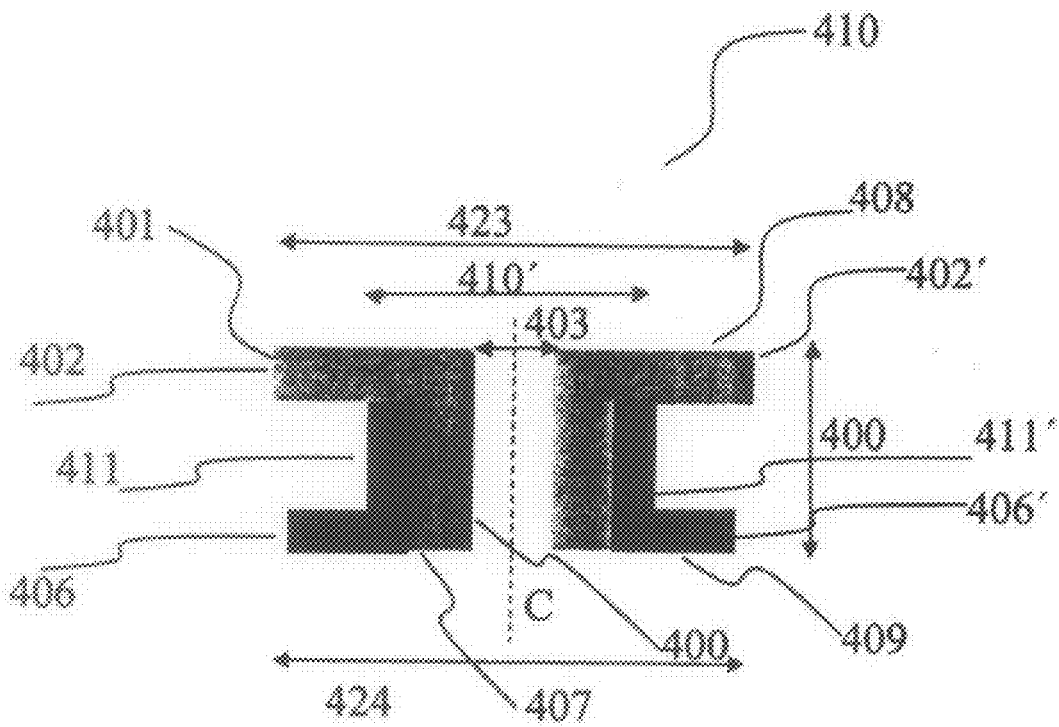
FIG. 4A shows a diagrammatic cross-section through a two-part lead-in element according to this invention.

FIG. 4A shows a lateral schematic sectional view of an embodiment of a two-part lead-in element 410 according to this invention.

The two-part lead-in element 410 consists here of two parts, an upper part, which is represented by less prominent stripes, and a lower part, which is represented by more prominent stripes.

Here the upper part may have in cross-section the shape of an upside down "L". The lower part also has in cross-section the shape of an "L" that is mirror reversed and has a smaller cross-sectional area.

The cross-sectional shape of the upper part has an upper side 408, sides 402 and 400, and a lower side 407.

The cross-sectional shape of the lower part has a lower side 409, an upper side 401 and sides 406 and 411.

The cross-sectional shapes of the upper and lower parts are rotationally symmetrical and give rise to two-part lead-in element 410 when rotated about axis C.

Distances 410', 423 and 424 between sides 411 and 411', 402 and 402', and between 406 and 406', are also shown.

Opening 403 of the two-part fastening element corresponds to the subsequent opening through which a fastening means can be guided to secure the screening element in the body compartment in a heat insulating, sound and vibration damping manner.

Figure 4B:
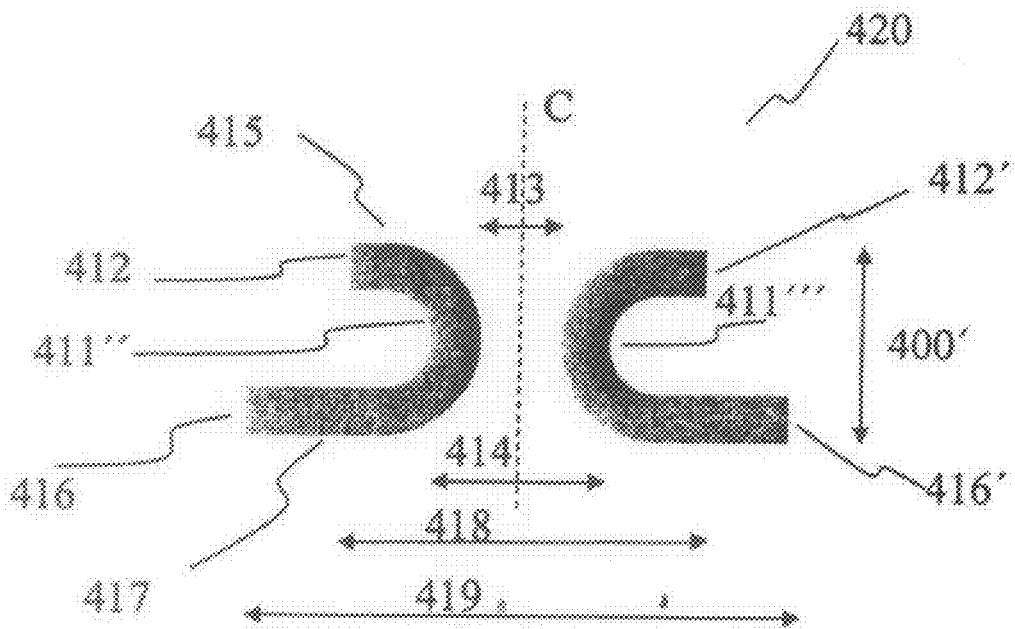
FIG. 4B shows a diagrammatic cross-section through a single-part lead-in element according to this invention.

FIG. 4B shows a lateral diagrammatic sectional view of an embodiment of a single-part lead-in element 420 according to this invention.

Lead-in element 420 consists in this case of a through part.

In this case the formation of lead-in element 420 has a cross-sectional shape which comprises an upper part 415, a lower part 417 and lateral parts 411" and 411'".

Distances 414, 418 and 419 between sides 411" and 411'", 412 and 412' and between 416 and 416' are also shown.

The cross-sectional shape shown in FIG. 4B is rotationally symmetrical and gives rise to single-part lead-in element 420.

Opening 413 of the single-part fastening element corresponds to the subsequent opening through which fastening means can be guided in order to secure the screening element in the body region in a heat insulating, sound and vibration damping manner.

Figure 5:
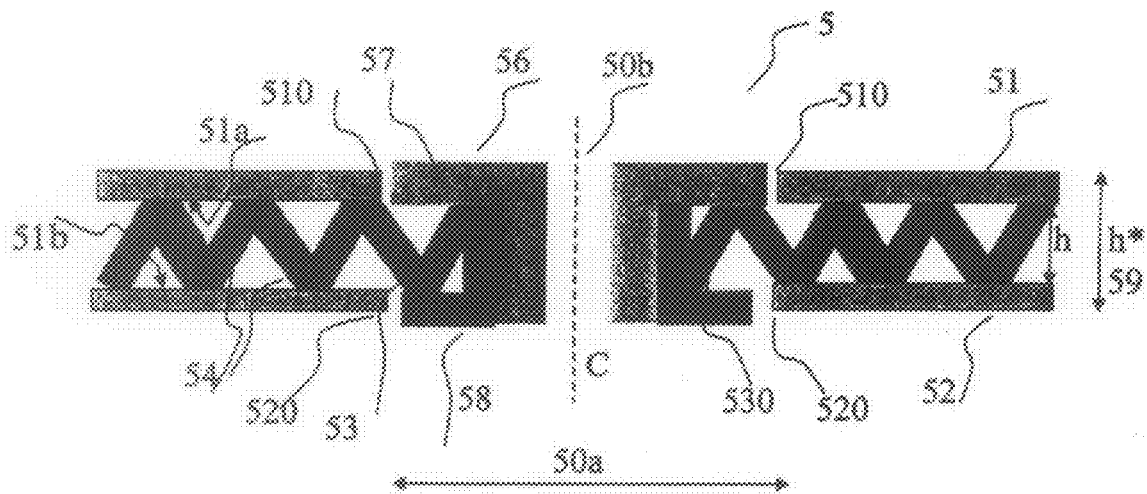
FIG. 5 represents a diagrammatic side view of an embodiment with a lead-in element according to this invention.

FIG. 5 shows a diagrammatic side view of an embodiment of screening element 5 with two-part lead-in element 56.

Screening element 5 of this invention comprises two outer layers 51 and 52, which comprise a metal material, preferably aluminium, noble metal, refined steel of Al-coated refined steel, and in this case may have the same or different material thickness.

An insert 53, which may be a lattice-shaped expanded metal and/or a plastic lattice, which is arranged under a defined pre-tension between outer layers 51 and 52 of screening element 5, extends between the outer layers.

The cross-sectional areas of the opening of outer layers 51 and 52 and the opening of insert 53 are in this case different to ensure that lead-in element 56 inserted through the opening of insert 53 does not come into contact with outer layers 51 and 52.

The individual chambers 54 of insert 53 form air cushions between the smooth end faces 51a and 51b of outer layers 51 and 52 facing each other, which cushions are responsible for a corresponding heat insulation, sound and vibration damping, where the number of air cushions can be predetermined by varying distance h between the two end faces 51a and 51b according to the application.

According to a further embodiment the surface of outer layers 51 and 52 of the screening element of this invention may be of any design, spatially and superficially.

According to a further embodiment the surface of layer 51 and 52 of the screening element of this invention may be designed similarly to the surface of the embodiments shown in FIG. 3 and FIG. 4.

In addition, FIG. 5 shows coaxial openings 510, 520 and 530 of outer layers 51 and 52, together with insert 53, which form a common opening 50 b, which receives a two-part lead-in element 56.

Here lead-in element 56 is a two-part lead-in element, but it may be a multi-part lead-I element, which runs in centred fashion around an opening 50b of insert 53, the multi-part lead-in element 56 is compressed to a varying degree with the insert.

Furthermore, surfaces 57 and 58 of multi-part lead-in element 56 act as a compression limiter and allow suitable fastening of the screening element in the body region without undesirable deformation of the insert.

The intensity of the compression of two-part lead-in element 56 is characterised by a height 59 (h*) between an upper partial region 57 of lead-in element 56 and a lower partial region 58 of lead-in element 56, and results, as described above, in corresponding head insulating, sound and vibration damping properties in the case of loose or fixed compression.

Furthermore, upper partial region 57 and lower partial region 58 of multi-part lead-in element 56 may be designed in any shape and material thickness.

Figure 6:
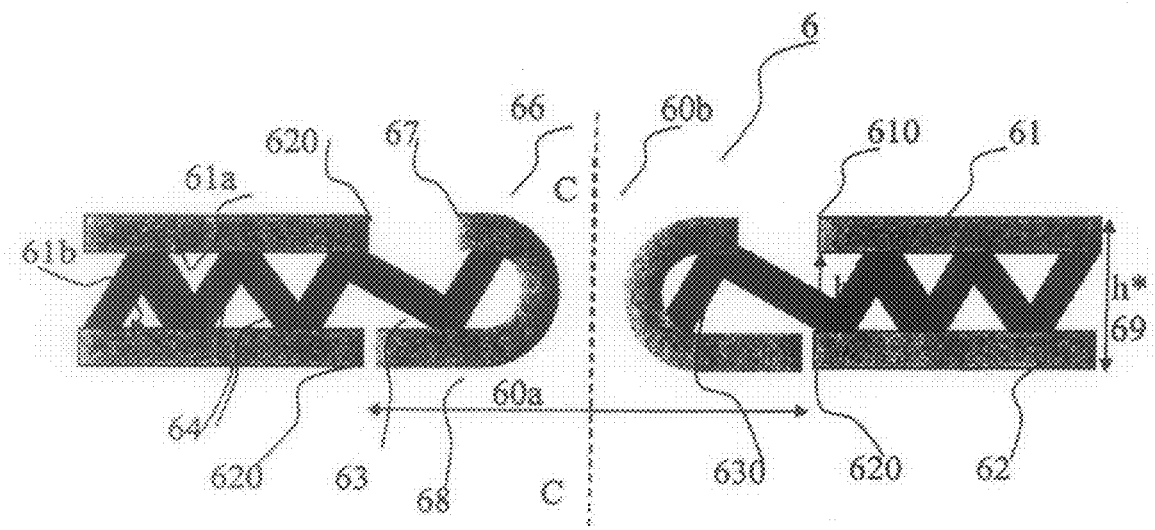
FIG. 6 represents a diagrammatic side view with a lead-in element of a further embodiment according to this invention.

FIG. 6 shows a further diagrammatic side view of an embodiment of a screening element 6 with single-part lead-in element 66.

Screening element 6 of this invention comprises two outer layers 61 and 62, which comprise a metal material, preferably aluminium, noble metal, refined steel or Al-coated refined steel, and may have the same or different material thicknesses.

An insert 63, which may be a lattice-shaped expanded metal with a defined pre-tension or a plastic lattice, extends between the outer layers.

The cross-sectional areas of the opening of outer layers 61 and 62 and the opening of insert 63 vary in this case to ensure that lead-in element 66 inserted through the opening of insert 63 does not come into contact with outer layers 61 and 62.

The individual chambers 64 of insert 63 form air cushions between the smooth end faces 61 and 61 of outer layers 61 and 62 facing each other, which cushions are responsible for a corresponding heat insulation, sound and vibration damping, where the number of air cushions can be predetermined by varying distance h between the two end faces 61a and 61b according to the application.

According to a further embodiment the surface of outer layers 61 and 62 of screening element 6 of this invention may be of any design, spatially and superficially.

According to a further embodiment the surface of outer layers 61 and 62 of screening element 6 of this invention may be designed similarly to the surface of the embodiments shown in FIG. 3 and FIG. 4.

Coaxial openings 610, 620 and 620 of outer layers 61 and 62, together with insert 63, form a common opening 60b in which a single-part lead-in element 66 is received.

Single-part lead-in element 66 compressed to varying degrees with insert 63 around an opening 630 of insert 63, which is characterised by a height 69 between upper partial region 67 of lead-in element 66 and lower partial region 68 of lead-in element 66, and as described above, results in corresponding heat insulating, sound and vibration damping properties in the case of loose or fixed compression.

Furthermore, upper partial region 67 and lower partial region 68 of lead-in element 66 may be designed in any shape and material thickness.

Furthermore, single-part or multi-part lead-in element 66 acts as a compression limiter in order to protect the insert from undesirable compression.

Figure 7:
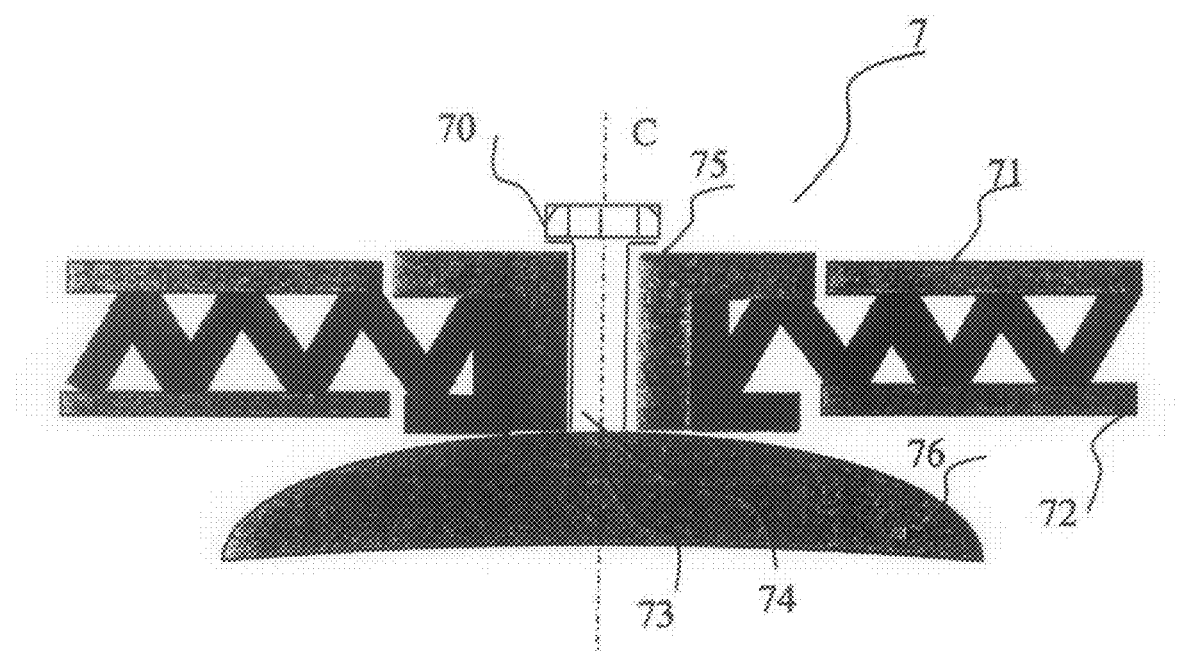
FIG. 7 represents a diagrammatic side view of an embodiment according to this invention with a lead-in element, the screening element being fastened in the body region, for example.

FIG. 7 shows a diagrammatic side view of an embodiment of screening element 7 of this invention, which is secured in the engine compartment, for instance.

Screening element 7 is in this case provided with a multi-part lead-in element 75 through whose opening 74 a fastening means 70, such as a screw or other connection means, can be guided, thus enabling screen element 7 to be fastened to a desired point 73 of body 76.

Upper side 71 of screening element 7 in FIG. 7 has in this case a heat or vibration source. Similarly, lower side 72 may have also a heat or vibration source.

On the correspondingly distant side of the heat or vibration source there is therefore a correspondingly improved heat insulation, sound and vibration damping of a hot and/or vibrating component relative to surrounding body environment 76, the heat insulation, sound and vibration damping depending on the insert used (material, geometry), the respective out layers (material, geometry) the intensity of the compression of the lead-in element with the insert, the diameter of the opening, etc.

In a further embodiment of this invention screening element 7 can also be mounted with single-part lead-in element 420 in the vicinity of a hot component in body region 76.

The invention claimed is:

1. A screening element for thermal and/or acoustic screening of a heat and/or sound radiating component of a vehicle, comprising at least two separated outer layers, between which an insert is arranged, wherein said at least two separated outer layers and said insert have coaxial openings, wherein said openings of said respective outer layers have larger cross-sectional areas than said opening of said insert, wherein a lead-in element is mounted in a common opening, which is formed by said coaxial openings, wherein said lead-in element has a flanged upper region and a flanged lower region overlying said insert within said openings of said outer layers, wherein there is no contact between said lead-in element and said outer layers, wherein said lead-in element has an opening.

2. The screening element according to claim 1 wherein said lead-in element is one of a single-part lead-in element or a multi-part lead-in element.

3. The screening element according to claim 2, wherein said lead-in element is a hollow rivet.

4. The screening element according to claim 2 wherein said lead-in element is mounted with radial clearance in the insert and is rotatable about an axis C.

5. The screening element according to claim 2 wherein said lead-in element is fixed in said opening of said insert.

6. The screening element according to claim 2 wherein said insert consists of a metal or plastic lattice.

7. The screening element according to claim 2 wherein a first and/or a second section of said multi-part lead-in element consist of the same or different material which is formed from at least one of the group of sheet materials consisting of aluminum, noble metal, refined steel or Al-coated steel and combinations thereof.

8. The screening element according to claim 7 wherein said first and said second sections of said multi-part lead-in element have different material thicknesses.

9. The screening element according to claim 1 wherein said at least two outer layers and said at least one insert are connected to each other in that each said outer layer is formed in a plurality of essentially parallel, upright ribs extending in a first direction, which are separated by associated recesses, wherein said recesses of one of said at least two outer layers are received in said ribs of the other of said at least two outer layers.

10. The screening element according to claim 9 wherein said ribs have recoiling lateral walls and vary in width along their length.

11. The screening element according to claim 10 including corrugations extending in a second direction which are inclined by an angle of at lest 10° to said first direction and said corrugations are essentially constant in width along their width.

12. The screening element according to claim 11 wherein said angle between said first direction of said ribs and said second direction of said corrugations is essentially 90°.

13. The screening element according to claim 1 wherein said insert is formed from an expanded metal and has a regular mesh network.

14. The screening element according to claim 1 wherein said insert consists of at least one of aluminum, noble metal, refined steel, Al-coated refined steel or combinations thereof.

15. The screening element according to claim 1 wherein said coaxial openings have an essentially circular cross-section.

16. The screening element according to claim 1 wherein a surface contact of said lead-in element is regulated in a partial region of an outer face of said lead-in element by suitable compression of said lead-in element.

17. The screening element according to claim 1 wherein said coaxial openings of said outer layer have the same diameter.

18. The screening element according to claim 1 wherein said outer layers comprise at least one metal material selected from the group consisting of aluminum, noble metal, refined steel or Al-coated refined steel or combinations thereof.

19. The screening element according to claim 1 wherein said outer layers comprise a plurality of coats of metal layers which comprise at least one material selected from the group consisting of sheet aluminum, noble metal, refined steel or Al-coated steel or combinations thereof.

20. The screening element according to claim 1 wherein the material thicknesses of said at east two outer layers are different.

21. The screening element according to claim 1 wherein several coats of said inserts are enclosed between said at least two said outer layers.

* * * * *